April 12, 1932.  C. C. NUGENT  1,853,572
COMBINATION WHEEL
Filed June 3, 1931
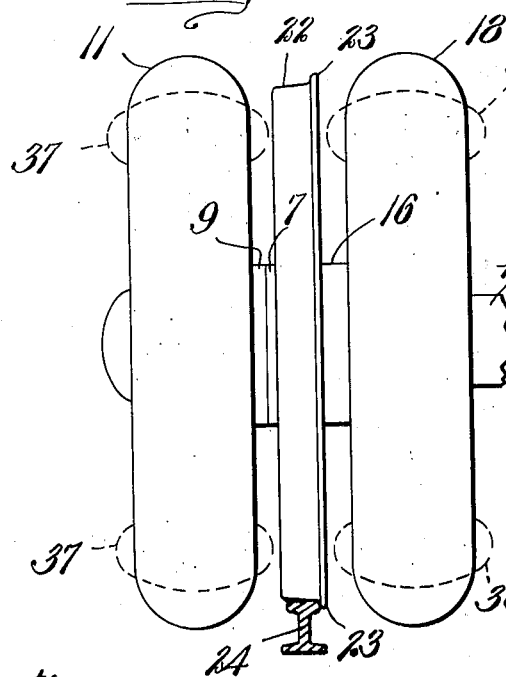
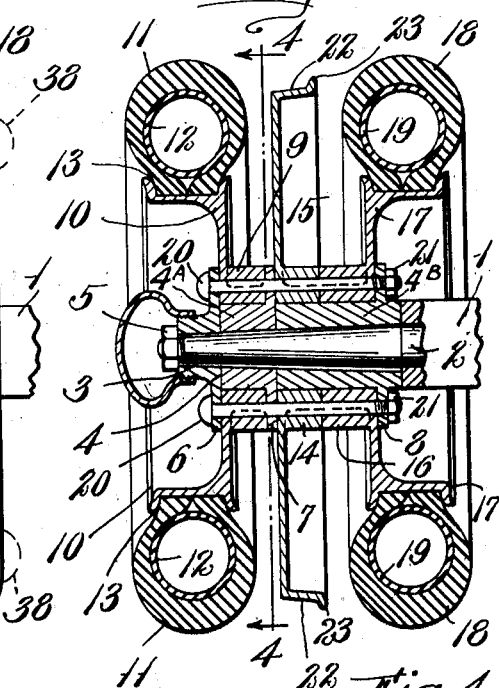
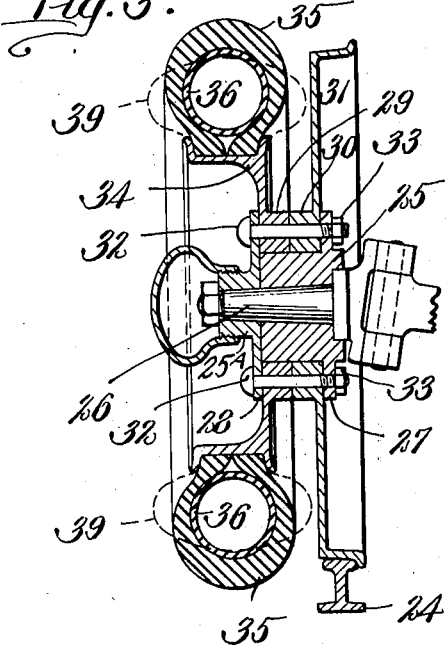
Inventor:
Christopher C. Nugent
by George A. Rockwell,
Atty.

Patented Apr. 12, 1932

1,853,572

UNITED STATES PATENT OFFICE

CHRISTOPHER C. NUGENT, OF WINTHROP, MASSACHUSETTS

COMBINATION WHEEL

Application filed June 3, 1931. Serial No. 541,797.

The principal object of my invention is to provide a combination wheel for vehicles having especial utility in connection with trucks or other automobiles, which may be used for riding along an ordinary highway and also along the rails of a railroad such, for example, as the railroads for steam or electric cars.

A feature of my invention is the combination of two wheels in suitable adjacency, one of which has a periphery of permanent size to ride on a rail when desired and the other of which is deflatable to change the size of its periphery and, in the preferred form, being adapted to become of less diameter than the first-mentioned wheel and consequently not furnishing an active tread surface but when inflated having an active tread surface and raising the first-mentioned wheel so that the latter's periphery is no longer an active tread surface.

Other features will be pointed out below.

In the drawings

Figure 1 is an elevation of a combination wheel embodying my invention and to be used as the rear wheel of a vehicle;

Figure 2 is a central longitudinal section of the combination wheel of Figure 1;

Figure 3 is a central longitudinal section of a combination wheel embodying my invention and to be used as a front wheel; and Figure 4 is a section on line 4—4 of Figure 2.

Axle housing 1 is provided, as shown in Figure 2, for axle 2, which is keyed at 3 to bushings 4 and 4A and 4B, the axle being held by nut 5 against longitudinal movement with relation to the bushings. The bushings have annular perforated collars 6, 7 and 8. Between collars 6 and 7, and in engagement with bushing 4A, is mounted a horizontal tubular perforated portion 9 of rim 10, the latter having mounted on it a rubber shoe 11, which may be of ordinary construction and which encloses an ordinary inflatable and deflatable rubber inner tube 12 held in place as usual by walls 13 of the shoe 11. A suitable valve may be provided for such inflation.

Between collars 7 and 8, and in engagement with bushing 4B, are mounted the tubular horizontal perforated portion 14 of wheel 15 and the tubular horizontal perforated portion 16 of rim 17, the latter having shoe 18 and inner tube 19, like shoe 11 and inner tube 12.

The horizontal perforated portions 9, 14 and 16 are held between the collars by bolts 20 and nuts 21.

The wheel 15 is of metal and its periphery 22 is of permanent size and is provided with annular lip 23 to engage the side of rail 24. The construction shown in Figures 1 and 2 is preferred for both of the rear wheels, although of course in the rear wheel not shown the parts 22 and 23 will be reversed.

In the form shown in Figure 3, which I prefer for front wheels, bushings 25 and 25A are mounted on axle 26 and have collars 27 and 28 between which are mounted the horizontal tubular perforated portions 29 and 30, it being noted that the horizontal tubular portion 30 of metal wheel 31 extends to the left instead of to the right, these horizontal tubular portions being held by bolts 32 and nuts 33. The horizontal portion 29 is integral with rim 34 which carries shoe 35 and inner tube 36.

When it is desired to use the wheel 15 to run on the rail 24 having its periphery 22 as the active tread surface, the tires or shoes 11 and 18, or 35, are deflated and the shoes then occupy substantially the positions shown respectively in dotted lines at 37, 38 and 39 so that the shoes will not furnish an active tread surface, the lowest portions of the shoes being above the top of rail 24. Even if the deflation were not quite so complete as I have indicated and if the bottom of the shoe, when deflated, were slightly below the top of rail 24, the deflatable wheel would have no active tread action and would be adapted to become, when necessary, of less diameter than the diameter of the solid metal wheel, an example of this being when the vehicle crosses frogs or switches or grade crossings where the top of the rail might be lower than the surfaces adjacent to it. In such case the deflated wheel or wheels would have their tread surfaces pressed upward slightly but without said tread surfaces becoming active and consequently saving wear of the shoes, this saving being a great advantage of my invention.

When the deflatable wheels are inflated they actively engage the roadway and the wheels 15 and 31 are not active.

What I claim is:

1. A device of the character described comprising a wheel having a periphery of permanent size; and another wheel which is deflatable, the diameter of said other wheel, when the latter is inflated, being larger than the diameter of the first-mentioned wheel, and, when said other wheel is deflated, being adapted to become of less diameter than the diameter of the first-mentioned wheel, said other wheel being so located with reference to said periphery of permanent size that it may be deflated to the normal deflated position and that it will not, when so deflated, project within the path of said periphery.

2. A device of the character described comprising an axle; a wheel mounted on said axle and having a periphery of permanent size; and another wheel which is deflatable, said other wheel being mounted on said axle, the diameter of said other wheel, when the latter is inflated, being larger than the diameter of the first-mentioned wheel, and, when said other wheel is deflated, being adapted to become of less diameter than the diameter of the first-mentioned wheel, said other wheel being so located with reference to said periphery of permanent size that it may be deflated to the normal deflated position and that it will not, when so deflated, project within the path of said periphery.

3. A device of the character described comprising an axle; a wheel mounted on said axle and having a periphery of permanent size; and two other wheels, both of which are deflatable and when inflated being of substantially the same diameter, one of said other wheels being mounted on said axle in suitable adjacency to, and at one side of, the first-mentioned wheel, the other of said other wheels being mounted on said axle in suitable adjacency to, and at the other side of, the first-mentioned wheel, the diameter of said other wheels, when the latter are inflated, being larger than the diameter of the first-mentioned wheel, and, when said other wheels are deflated, being adapted to become of less diameter than the diameter of the first-mentioned wheel, said other wheels being so located with reference to said periphery of permanent size that they may be deflated to their normal deflated positions and that they will not, when so deflated, project within the path of the said periphery.

4. A device of the character described comprising an axle; a wheel on said axle and having a tread surface of permanent size; and another wheel on said axle adjacent to the first-mentioned wheel, said other wheel being deflatable to change the size of its active tread surface, said other wheel being so located with reference to said periphery of permanent size that it may be deflated to the normal deflated position and that it will not, when deflated, project within the path of said periphery.

CHRISTOPHER C. NUGENT.